Patented Aug. 26, 1952

2,608,540

UNITED STATES PATENT OFFICE 2,608,540

THERMOPLASTIC ADHESIVE

Barbara W. Paré and Arthur F. Paré, Janesville, Wis.

No Drawing. Application January 24, 1950, Serial No. 140,345

3 Claims. (Cl. 260—23)

This invention relates to a thermoplastic adhesive, and more particularly to such an adhesive which is especially adapted to form a dry coating on translucid films and the like so that they may be subsequently secured to various materials by the application of relatively low heat and pressure.

Such a coated film has many possible applications, and may be utilized particularly, for example, in providing a protective surface for printed material, which surface provides high gloss, washability and resistance to damage by handling. Some of such products which may be so treated are wallpaper, maps, labels, catalogues, shipping tags, blueprints, price lists, books and book covers, tab indexes, charts, documents, gauge dials, and the like.

Likewise, fabrics such as those which are used in the manufacture of luggage can by this treatment be made hard, water proof, and scuff proof, and yet be easily shaped. Cloth, when made waterproof and inert to many chemicals by this process, may be used in the manufacture of raincoats, umbrellas, table cloths, place mats, table tops, lamp shades, upholstery fabric, window shades and curtains, floor and wall tile, and the like.

In addition to this process of covering various products and materials, plastic sheeting and film is also widely used alone in the fabrication of containers and other articles, such as toys, novelties, and the like. Although films completely coated with a dry, thermoplastic adhesive are generally not necessary for use in such fabrication work, it is often necessary to join the plastic material to itself to form a seam, for example. The general methods which are utilized in such a joining operation are sewing, heat sealing, solvent sealing and cementing, but all of these have numerous disadvantages and limitations. In sewing, for example, the joint is ordinarily rather weak and oftentimes therefore not appropriate for the particular type of use to which the finished product is to be put. The needle perforates the film, rendering it susceptible to tearing along the stitch line and between stitch points. The joint is held only by the tension of the thread which, for this purpose, is deliberately made loose.

Successful heat sealing of thermoplastic film has the disadvantage of requiring carefully controlled critical conditions of time, temperature and pressure. These factors require reconsideration every time the material being sealed is changed or the thickness thereof is altered. The apparatus necessary is also rather complicated and expensive.

On the other hand, when solvents are utilized to obtain a suitable sealing area, an undesirable waiting period is normally necessary for them to take effect. The proper quantity must be used to minimize excess "squeeze out," and pressure must be applied only when the film is sufficiently soft to effect adhesion. The use of heat is normally necessary to evaporate the excess solvent. All of these considerations pose problems in many applications, the most significant one being the rather critical waiting period which is required between the application of the solvent and the application of pressure. Also, since the solvent utilized is in most cases equally effective on ink, it is difficult to avoid running of the ink and colors when transparent film is used as a protective overlay on printed paper if any sealing is required. In covering tab indexes, for example, where this solvent sealing process is utilized, rejects will normally run from 25 to 40% of total production because of running of the ink or colors.

Because of the problem arising in the spreading of the cements on plastic films the use of adhesives in any large quantity for fabricating articles from such films has up until now been impractical.

The adhesive which is the subject matter of this application provides a ready solution to the many problems inherent in all of the above presently used methods of joining and sealing of plastic films. The product is easy and simple to apply, since there are no critical temperatures or pressures involved, nor is any special equipment necessary. The adhesive needs only to be melted and subjected to light pressure for excellent results. Perfect joints, for example, have been achieved using only an ordinary household flatiron to apply both the heat and pressure necessary to the sealing operation.

It is therefore an object of this invention to provide an adhesive which is adapted to be utilized in the securing of translucid films, such as cellulose acetate, to various materials, which adhesive by the mere application of relatively low heat and pressure readily forms an intimate bond which can be broken only by destruction of the film itself or the material to which it is secured, the adhesive upon setting becoming an integral part of the film.

It is a further object to provide an adhesive of the character described that is particularly adapted to be colored and yet remain translucid.

Still another object of this invention is to provide an adhesive of the character described which is suitable for utilization with cellulose acetate, cellulose nitrate, or cellulose xanthate, either in bonding these materials to each other or to other substances, such as paper, cloth, leather, or the like.

Applicants have incorporated as the base constituent of their adhesive a thermoplastic resin which is preferably a polymerized vinyl acetate. Such vinyl compounds are readily available on the market, and in the present case the product known as "Vinyl-Seal T-24-9," a resin sold by Bakelite Corporation in solution form, has been found to be satisfactory. This resin solution is characterized by the Bakelite Corporation as a vinyl alcohol-vinyl acetate combination having 91% by weight of the latter therein, which resin is dissolved in toluol to form a solution which contains 24% by weight of the resin.

Although this particular resin solution is sold as an adhesive for producing strong impact resisting bonds between impervious surfaces, such as metals and phenolic substances, as well as bonding wood, paper and cloth, it has been found that such a solution does not make a good bonding medium between many substances, including cellulose acetate film. In such a solution, the solvent power of the toluol is almost completely taken up by the 24% of resin which it contains. The excess solvent power that remains is, however, sufficient to act as the softening agent when the solution is utilized with cellulose nitrate film, for example, but this is true only because cellulose nitrate film ordinarily contains camphor as a plasticizer in quantities on the order of 30%. This large amount of camphor enables the toluol, although weak, to easily attack the film and anchor the resin thereto.

Cellulose acetate, on the other hand, normally does not contain a plasticizer which could be attacked in this fashion by the excess toluol. As a matter of fact, there are many different plasticizers utilized in the manufacture of cellulose acetate film, the particular type depending upon the proposed end use of the film. Practically all cellulose acetate films are, however, treated with a glycol preparation during their manufacture. Since toluol is not miscible with glycol, the opposite effect is achieved when the resin solution is brought into contact with cellulose acetate as that which occurs when it is brought into association with cellulose nitrate. The ultimate result is that when the resin solution described is used with cellulose acetate, it can at best only lay down upon the surface of the acetate film a thin layer of resin, without any actual bonding between the film and the resin. This is illustrated by the fact that such a resin coating, after drying, is easily peeled off a cellulose acetate film. If the resin coating and the acetate film, however, are subjected to heat and pressure, the film itself softens along with the resin coating, and if the pressure is maintained until cooling occurs, a bond between the two can be achieved. This, of course, limits integral bonding to cases where enough heat is applied to soften the film as well as the resin and where suitable pressure is maintained until the resin and film are set.

Applicants are aware of the disclosure in the patent to Clyde Scott, No. 2,050,021, issued August 4, 1936, entitled "Composite Film and Picture and Method of Producing It." In this patent, it is claimed among other things that a solution of polymerized vinyl acetate in toluol, apparently substantially the same as the Bakelite product described above, may be used as an adhesive in securing a cellulose acetate film to a fibrous base member, such as a photograph, and that the cellulose acetate film upon application of heat and pressure within certain ranges will be intimately bonded to the resin coating, which coating in turn will be intimately bonded to the fibrous base member. Through extensive experiments, applicants have determined that if a vinyl resin solution in toluol of the character described in the Scott patent is applied to an acetate film, as indicated in the Scott disclosure, the resin coating does not become an integral part of the acetate film, either before or after the application of heat. Scott describes the toluol solvent as one which "while compatible for the synthetic resin, will not affect the cellulose acetate film at normal pressures and temperatures." The synthetic resin also does not affect the cellulose acetate film, even when sufficient heat is supplied to cause the former to melt, and therefore the "intimate bonding" described by Scott does not occur. It is conceivable that if sufficient heat is applied to melt not only the resin coat but also to soften the cellulose acetate film, more or less intimate bonding of some character might result. However, Scott is careful to point out that the most suitable pressure in the bonding operation should be at about 250 pounds per square inch, and the temperature should be "between the melting points of the two constituent materials" of his composite film. In other words, the temperature utilized should be above the lower melting point of the resin and below the higher "melting" or softening point of the cellulose acetate film.

Since neither the toluol nor the resin affect the film, after the toluol has been evaporated as described, it is possible to strip the resin coat cleanly from the acetate film, thereby indicating that no attacking and dissolution of the film surface has occurred due to action of the solvent. This was first noticed because blisters formed in the resin coat after the coated acetate film had been standing for a short time. Not only was no real bond formed between the resin coating and the film, but after laminating the acetate film, in the form of tabs, to paper by means of heat and pressure within the limits set out in the Scott patent, the tabs could be pulled off, and the resin coating would remain attached to the paper. Also, if left standing for a considerable period, the acetate tabs would tend to separate from the resin and drop off of their own accord, leaving the resin coating on the paper.

In an attempt to improve upon this unsatisfactory condition when dealing with cellulose acetate film, applicants have developed a new adhesive, which is very much simpler to use than the resin solution just described. In searching for an answer to the difficulties inherent in the use of a vinyl resin solution in toluol as an adhesive when dealing with cellulose acetate film, applicants have discovered that if a suitable substance is added to the resin solution which will cause the film to be physically affected in a way which will permit the resin to become intimately associated therewith, a suitable bond can subsequently be formed without the necessity of temperatures high enough to soften the film itself. In forming this new adhesive, applicants have added to the resin solution what may be characterized as a "softening agent" which preferably may be ethyl lactate, a solvent for cellulose and, in addition, an excellent solvent for many dyes which are particularly applicable and widely used for coloring coating work of the character described. In addition, ethyl lactate is completely compatible with the toluol and resin combination of the T-24-9, and when added to the latter combination will cause it to tolerate to some degree the addition of water, without producing a precipitation of the resin toluol combination as will normally occur if no ethyl lactate is present. The ethyl lactate also has a slow drying rate which permits sufficient film attack without having to resort to a solvent of such strength as to endanger the actual structure of the film. Also, under gentle heating, the ethyl lactate and toluol can be evaporated slowly enough to prevent the condensation of water from the atmosphere with the consequent undesirable "blushing" of the film, or spoilage due to a cloudy coating caused by water absorption.

The addition of ethyl lactate to the resin solution creates a new problem, however, since the drying characteristics of the mixture are then so altered that the coating will not normally dry satisfactorily. A suitable drying agent which may be incorporated has been found to be stearic acid. The stearic acid is added to the resin ethyl lactate mixture in powdered form and stirred until dissolved, it also being soluble in toluol. When this complete mixture is applied to a film of cellulose acetate and allowed to dry thereon, the stearic acid crystallizes out as tiny flakes uniformly distributed throughout the coating, giving the adhesive a more or less frosted appearance. The resultant dry coating has no tackiness, but is smooth and non-sticky to the touch. Under the influence of heat at the time of the actual sealing operation, the stearic acid flakes melt and merge with the adhesive to produce a clear, colorless, transparent bond.

It might also be pointed out here that this modified resin solution containing the ethyl lactate and stearic acid has a much lower melting point than the original T-24-9 solution which, of course, greatly simplifies the sealing operation. This effect may be a result of the fact that when the adhesive dries after having been applied to the surface of a film, not all of the ethyl lactate is evaporated, which in turn tends to keep the area at the junction of the film and the adhesive somewhat softer than would ordinarily be the case.

It has been previously mentioned that the ethyl lactate is also a fine solvent for suitable dyes which may be added to the adhesive to produce a simulated, colored film. Present practice is to color the film by applying dye to its surface, which has the disadvantages of rubbing off or running, if dampened by many substances. Also the number of colors capable of being produced is quite limited. On the other hand, if the adhesive is colored, rather than the film itself, the possibility of the color rubbing off is eliminated, as well as the undesirable running of the colors.

Turning now to a specific embodiment of the invention, an adhesive of the character described may be formed by adding 15 to 20% by weight of ethyl lactate to a solution of modified vinyl acetate resin comprising a vinyl alcohol-vinyl acetate combination having 91% by weight of the latter therein, which combination is dissolved in toluol to form a solution which contains 24%, by weight, of the resin. To each quart of such mixture is added 30 grams dry weight of stearic acid in powdered form, the resultant mixture being stirred until the stearic acid is dissolved. When a colored adhesive is desired, the dye is dissolved in the ethyl lactate, the quantity of dye being dependent upon the shade of color desired. If special and unusual colors are desired, individual dyes may be separately dissolved in ethyl lactate, and the resultant solutions mixed in the proper proportions to produce the proper effect.

Although the quantities mentioned are most preferable, the range of ethyl lactate which may be utilized is approximately from 15 to 70% by weight of the resin solution, with a corresponding increase in the amount of stearic acid added up to 5% by weight.

A mixture so prepared may be readily applied in the form of a thin coating to a cellulose acetate film and allowed to dry. The spreading of the adhesive in the form of a suitable coating between one-half to three-quarters of one-thousandth (.0005 to .00075) of an inch thick can be readily accomplished by use of apparatus disclosed in applicants' co-pending application, Serial No. 192,563, filed October 27, 1950.

The resultant coated cellulose acetate film can readily be intimately bonded to other uncoated materials by the application of relatively low heat and pressure, the temperature necessary being preferably between 150 to 240 degrees Fahrenheit, and the pressure necessary being only enough to maintain the combination being sealed together in the proper close association or, more specifically, between 25 to 200 pounds per square inch.

These sealing temperatures referred to are the actual temperatures required within the combination to be sealed. Film sealing requirements without any adhesive, such as by actually softening the film, are ordinarily between 240 to 300 degrees Fahrenheit, at a pressure of 200 to 1000 pounds per square inch. It therefore can be seen that when utilizing applicants' adhesive, the temperature can always be maintained below the point at which the film can be sealed to itself by softening without the use of an adhesive. Because of this fact, the stretching which often occurs when uncoated plastic film is under pressure is eliminated, and the shrinkage which often occurs as the softened film cools, is also avoided. These temperatures are, of course, only illustrative of what they would be generally for uncoated films, but regardless of what the exact softening point is, as long as it is above the melting point of the resin, applicants' adhesive can be utilized with excellent results. The temperature can always be maintained below the plastic point of the film so that undesirable results of heat softening the film can be avoided. In actual practice, when heated plates are utilized with applicants' adhesive for applying both the necessary heat and pressure, they normally are kept at a temperature between 350 to 400 degrees Fahrenheit, so that the sealing temperature may be introduced into the mass in an extremely short interval of time. Obviously, if the temperature of the plates is within this range and they are applied for longer than a very momentary application, the film will be undesirably distorted by softening.

The coated film may also be similarly applied to any fibrous base, such as cloth or paper, and as pointed out above, by substantially the same process. When so applied, the film will have become an integral part of the resin coating so that in order to strip the film from the covered material, it will be necessary to at least partially destroy the latter.

An alternative softening agent may be used in place of the ethyl lactate in the form of glacial acetic acid. When the acetic acid is substituted for the ethyl lactate, the amount of stearic acid necessary is greatly reduced, and in some instances entirely eliminated. The end result with such a mixture, however, is substantially the same as that described for the mixture containing ethyl lactate, the resin coating becoming an integral part of the film so that an intimate bond is formed therebetween upon the application of heat and pressure.

Whereas applicants have spoken of the ethyl lactate and the glacial acetic acid as "softening agents" for the film, the actual chemical and physical action which takes place when the film is softened or at least attacked in such a way as to cause the resin solution to become intimately associated therewith is not too well understood. This term "softening agent" has been utilized only as a convenient form of expressing what seems to be the type of reaction which takes place.

One theory explaining the reaction between the film and the softening agent regards the cellulose acetate film as the wall of bricks in which there is no mortar. The ethyl lactate in the resin solution when spread upon the wall penetrates into the spaces between the "bricks" of the film, prying them apart and actually causing the film to swell. If the amount of ethyl lactate thus associated with the film were sufficient, the film would eventually be disintegrated. However, the quantity utilized merely serves to open up the structure of the film. The toluol, which is the most easily evaporated component of the resin solution, then begins to leave the solution, which action, in turn, causes the resin to be deposited between the bricks which have been pried apart. Finally, as the ethyl lactate evaporates, the wall again becomes a unit structure with the vinyl resin deposited like mortar.

Although all of the preceding discussion has been directed primarily toward the use of the adhesive in question as a means of securing translucid films to other substances, an additional application obviously could involve the formation of films of this general type which are coated on both sides and therefore are particularly adapted for use as a means of bonding two articles of either the same or different material together.

Although the adhesive described herein is particularly suited for use with cellulose acetate film, it should be pointed out that the characteristics which adapt it for such use do not affect its ability to be utilized with other films, such as cellulose nitrate and cellulose xanthate film. As mentioned above, the additional solvent power of the toluol over and above that utilized in dissolving the 24% of resin is sufficient to attack the cellulose nitrate and cellulose xanthate films in such a way as to anchor the resin thereto, upon subsequent evaporation of the liquid components of the adhesive.

Applicants' adhesive is therefore capable of being utilized with these three types of film or any other such type of film which is either susceptible to attack by toluol or the softening agent incorporated therein. It forms a much more satisfactory product than one which amounts to primarily a solution of the vinyl resin alone, such as disclosed by Scott, since both the necessary temperatures and pressures are radically reduced as well as producing an intimate bond between both the plastic film and the coating of resin, and the coating of resin and the material to which the film is being secured.

What is claimed is:

1. A thermoplastic adhesive having a melting point between 150 and 240° F. which is particularly adapted for use with cellulose acetate film comprising from 85 to 30 parts by weight of a toluol solution of a partially saponified polyvinyl acetate containing a major portion of vinyl acetate and a minor portion of vinyl alcohol, from 15 to 70 parts by weight of a film softening agent selected from the group consisting of ethyl lactate and glacial acetic acid, and not more than 5 parts by weight of stearic acid.

2. A thermoplastic adhesive having a melting point between 150 and 240° F. which is particularly adapted for use with cellulose acetate film comprising from 85 to 30 parts by weight of a toluol solution of a partially saponified polyvinyl acetate containing a major portion of vinyl acetate and a minor portion of vinyl alcohol, from 15 to 70 parts by weight of ethyl lactate, and not more than 5 parts by weight of stearic acid.

3. A thermoplastic adhesive having a melting point between 150 and 240° F. which is particularly adapted for use with cellulose acetate film comprising from 85 to 30 parts by weight of a toluol solution of a partially saponified polyvinyl acetate containing a major portion of vinyl acetate and a minor portion of vinyl alcohol, from 15 to 70 parts by weight of glacial acetic acid, and not more than 5 parts by weight of stearic acid.

BARBARA W. PARÉ.
ARTHUR F. PARÉ.

REFERENCES CITED

The following references are of record in the file of this patent:

UNITED STATES PATENTS

| Number | Name | Date |
| --- | --- | --- |
| 1,784,008 | Herrmann et al. | Dec. 9, 1930 |